June 30, 1953 O. D. GRANDSTAFF 2,644,044
VOICE CURRENT REPEATER
Filed May 28, 1949
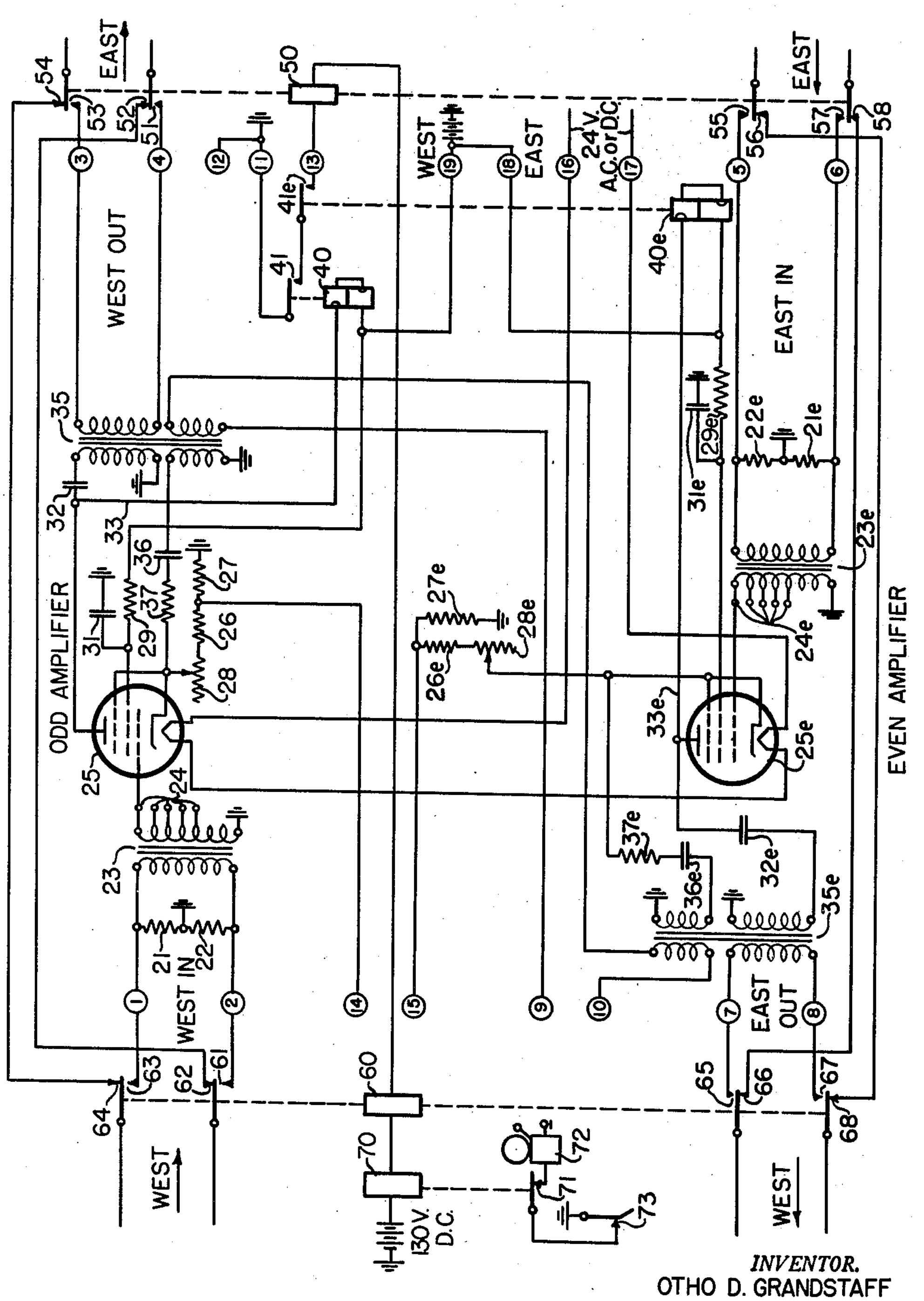
INVENTOR.
OTHO D. GRANDSTAFF
BY
ATTORNEY Patented June 30, 1953

2,644,044

UNITED STATES PATENT OFFICE 2,644,044

VOICE CURRENT REPEATER

Otho D. Grandstaff, Oak Park, Ill., assignor to Automatic Electric Laboratories, Inc., Chicago, Ill., a corporation of Delaware Application May 28, 1949, Serial No. 96,052

1 Claim. (Cl. 179—171)

The present invention relates to two-way amplifying means for transmitting signals in each direction of two-way transmission systems. More particularly, the invention is concerned with new and useful improvements in voice current repeaters.

It is an object of this invention to provide an improved method and apparatus for detecting and providing a by-pass circuit for a faulty voice current amplifier.

It is a further object of this invention to provide an improved apparatus for detecting and by-passing a faulty voice current amplifier of the type utilizing a vacuum tube of low plate current.

A feature of the invention is a relay operated amplifier by-pass circuit in which the direct current component of the vacuum tube plate currents is used to operate the by-pass control relays, while the alternating current component is coupled through a capacitor to output means.

A more specific feature of the invention is a relay to control the amplifier by-pass circuit, operated by the direct current component of the vacuum tube plate current, its winding designed to have a high inductance and low distributed capacitance so that it also serves as an alternating current blocking impedance.

Novel features believed to be characteristic of the invention are set forth with particularity in the appended claims. The invention, together with further objects and features thereof, will best be understood by reference to the following specification, taken in connection with the accompanying drawing which illustrates a telephone repeater system having incorporated therein the features of the invention briefly outlined above.

Referring to the drawing a portion of a repeater is shown consisting of two amplifying circuits arranged for use with a telephone circuit. The two amplifying circuits may be conveniently mounted on a panel (not shown) which may also have a terminal block with terminals 1 to 19 mounted thereon. The odd and even amplifiers can be associated with any conventional type of hybrid circuit to couple them to the west and east lines.

One of the incoming line circuits enters at the west position through terminals 1 and 2 and leaves through terminals 3 and 4. The other line circuit enters at the east position through terminals 5 and 6 and leaves through terminals 7 and 8. Since both amplifying circuits are identical a detailed explanation of the operation of only the odd amplifier will be given. The numerals for the even amplifier will be the same as the numerals for the corresponding parts in the odd amplifier except that the subscript "*e*" will be added to the numerals of the latter.

Incoming voice signal conductors are connected to terminals 1 and 2 of the odd amplifier. The odd amplifier itself may be of a standard circuit insofar as amplification is concerned. The odd amplifier has a pair of resistors 21 and 22 on the input side thereof which serve as a terminating impedance. The incoming signal is passed through a transformer 23. The secondary winding of transformer 23 has taps 24 which may be used to adjust the gain, preferably in steps of about 5 db each.

The secondary winding of transformer 23 supplies the control voltage to the grid of a pentode tube 25. Heater current for tube 25 is supplied through terminals 16 and 17 from a source (not shown) such as 24-volt alternating or direct current.

Cathode resistors 26, 27 and 28 provide the grid bias. Variable resistor 28 may be used to vary the gain within the 5 db steps of taps 24 of the secondary winding of transformer 23.

The screen grid of tube 25 has a voltage dropping resistor 29 in its circuit along with a bypass capacitor 31. The suppressor grid of tube 25 is connected to the cathode circuit.

The A.-C. component of the plate current of the tube 25 passes to the primary winding of an output transformer 35 through a capacitor 32. The D.-C. component of the plate current flows by means of shunt conductor 33 to a relay 40. All of the direct current is thus used to operate the relay 40 while all of the alternating current is passed through the transformer 35, a secondary winding of which is connected to outgoing terminals 3 and 4 in the case of the odd amplifier and 7 and 8 in the even amplifier.

A negative feedback path from a second secondary winding of transformer 35 to the cathode-suppressor circuit is provided through capacitor 36 and resistor 37. A third secondary winding of transformer 35 is mounted for a monitor circuit which will be described hereinafter.

The relay 40 has a two-section winding which also functions as a plate inductance and is so designed that little distributed capacitance is present in the winding. The winding thus serves the dual purpose of providing a direct current path for the actuation of the relay armature and at the same time, of providing a high impedance as an effective block to a broad band of amplifier output frequencies.

Power for the plate of tube 25 is supplied from an external source preferably of about 130-volts D. C. through terminal 19 (terminal 18 in the case of the even amplifier). This power source also energizes the relay 40 when tube 25 is operating properly.

When relay 40 is energized it closes its contacts 41 and, similarly, relay 40*e* closes its contacts 41*e*. This furnishes ground through terminal 13 for the operation of three relays 50, 60, and 70 which are external to the amplifiers but which may conveniently be included with the line equipment of the repeater.

Relays 50, 60, and 70 control by-pass and alarm circuits for the odd and even amplifiers. When either of the contacts 41 or 41*e* is open relays 50, 60, and 70 are not energized and the by-pass circuits around the two amplifiers are operative to pass the voice signals without amplification. Relay 70 when deenergized closes its contacts 71 to furnish ground for the operation of an alarm bell 72. However, a key 73 may be used to open the bell circuit to prevent ringing of the alarm when the repeater is intentionally taken out of service. Key 73 may include contacts of the repeater on-off switch.

*Operation of the repeater*

When the repeater is out of service relays 50 and 60 are deenergized and their contacts 52, 54, 62, and 64 are closed thereby by-passing the odd amplifier. Their contacts 56, 58, 66, and 68 complete a by-pass circuit for the even amplifier.

When the repeater is turned on, the plate currents of tubes 25 and 25*e* energize relays 40 and 40*e*, which close their contacts 41 and 41*e* to provide an operating circuit for relays 50, 60, and 70 as follows: ground, terminal 11, contact 41, contact 41*e*, terminal 13, the windings of relays 50, 60, and 70, respectively, battery, and return to ground.

Relays 50 and 60 are energized to close the contacts 51, 53, 61, and 63 to complete circuits to the odd amplifier through terminals 4, 3, 2, and 1 respectively. These relays also close the contacts 55, 57, 65, and 67 to complete circuits for the even amplifier through terminals 5, 6, 7, and 8, respectively.

Relay 70 opens the bell alarm circuit at its contacts 71. As long as both of relays 40 and 40*e* remain energized, both the odd and even amplifiers will be included in the repeater circuit and the bell 72 will be inoperative. However, when either of relays 40 and 40*e* becomes deenergized, the energizing circuit of relays 50, 60, and 70 will be broken, the by-pass circuits of both amplifiers will be cut in, and the alarm bell 72 will ring.

By having the relays 40 and 40*e* connected in parallel with the primary windings of transformers 35 and 35*e* and by including a capacitor 32 or 32*e* in the circuit of each transformer primary, the transformers are restricted to alternating current and the relays receive the full amount of direct current power dissipated in the plate load circuit. This circuit, referring now to the odd amplifier, is comprised of the plate of tube 25, relay 40, terminal 19, battery, ground, resistor 27, 26, and 28, cathode, and back to the plate of tube 25, and forms the path for the direct current component of the plate currents which, satisfactorily energizes the relay on as little as 8 ma. As long as the plate current of each tube is at this level or higher, the amplifiers will remain in the circuit. When the plate current of either tube descends below a level such as 6 ma. for any reason, one of the relays 40 and 40*e* will release and both of the amplifiers will be by-passed.

Means for monitoring the amplifiers is provided through one of the secondary windings of each of transformers 35 and 35*e*. These windings are connected to terminals 9 and 10. A telephone receiver connected to terminals 9 and 10 enables both directions of the repeater to be monitored at once.

A voltmeter may be connected between terminal 14 and ground for the purpose of indicating the cathode current of tube 25 by measuring the voltage drop in resistor 27. Terminal 15 serves a similar function for tube 25*e*.

While the values of the various capacitors and resistors shown may vary over a wide range without interfering with the usefulness of the device, the values shown below, wherein the numbers of the parts corresponds to the numbers on the drawing, have proved to be satisfactory:

| Part: | | Value |
|---|---|---|
| 21 | ohms | 300 |
| 22 | do | 300 |
| 26 | do | 400 |
| 27 | do | 100 |
| 28 | do | 2000 |
| 29 | do | 30000 |
| 37 | do | 1000 |
| 40 | do | 2000–2000 |
| 31 | mfd | 2.0 |
| 32 | mfd | 1.0 |
| 36 | mfd | 1.0 |

Parts with the subscript "*e*" have the value of the same numbered part without the subscript. Both of tubes 25 and 25*e* may be of the type 12SJ7. Each winding of the relays 40 and 40*e* has a resistance of about 2000 ohms.

It is to be understood that various modifications may be made in the form of this invention above described without departing from the spirit of the invention as cited in the appended claim.

What is claimed is:

In a voice current repeater system having a by-pass channel and a repeater channel, an amplifier connected in said repeater channel, a vacuum tube included in said amplifier having a plate and cathode and conducting a plate current of a particular value during normal operation, said current composed of a direct current component and an alternating current component, a circuit in said amplifier including said plate and said cathode having two parallel branches, a first of said parallel branches including a direct current blocking capacitor and amplifier output coupling means, a second of said parallel branches including a relay having a winding characterized by a high inductance and a low distributed capacitance and acting as an alternating current choke, and a source of plate potential, said first parallel branch forming a path for said alternating current component, said blocking capacitor shunting said direct current component along the path formed by said second parallel branch, said winding of said relay in said second parallel branch effectively preventing the passage of said alternating current component and energizing said relay by means of said direct current component when said plate current is of said particular value, and means operated by said relay to connect said repeater channel in said repeater system when said plate current is of said particular value and to connect said by-pass channel in said repeater system when said plate current falls below said particular value.

OTHO D. GRANDSTAFF.

References Cited in the file of this patent

UNITED STATES PATENTS

| Number | Name | Date |
|---|---|---|
| 1,530,685 | Morrill | Mar. 24, 1925 |
| 1,549,817 | Toomey | Aug. 18, 1925 |
| 1,607,980 | Green | Nov. 23, 1926 |
| 2,267,286 | Meyers | Dec. 23, 1941 |
| 2,379,069 | Dysart | June 26, 1945 |
| 2,491,263 | Herrick | Dec. 13, 1949 |
| 2,552,787 | Herrick | May 15, 1951 |